US006486608B1

(12) United States Patent
Chong

(10) Patent No.: US 6,486,608 B1
(45) Date of Patent: Nov. 26, 2002

(54) ELECTROLUMINESCENT DEVICE FOR COMMUNICATION APPARATUS OF MOBILE PHONE FOR INFORMING AN INCOMING CALL

(76) Inventor: Sze Huen Chong, P.O. Box 82-144, Taipei (TW)

( * ) Notice: Subject to any disclaimer, the term of this patent is extended or adjusted under 35 U.S.C. 154(b) by 0 days.

(21) Appl. No.: 09/515,913

(22) Filed: Mar. 1, 2000

(51) Int. Cl.[7] .................................................. G09G 3/10
(52) U.S. Cl. ..................................... 315/169.3; 315/120
(58) Field of Search .......................... 315/169.3, 200 A, 315/241 P, 209 R, 209 T, 209 CD, 77, 78, 119, 120, 128; G09G 3/10

(56) References Cited

U.S. PATENT DOCUMENTS 5,754,064 A * 5/1998 Chien .......................... 327/108
5,821,697 A * 10/1998 Weber ...................... 315/200 A
6,073,034 A * 6/2000 Jacobsen et al. ............. 455/566
6,118,426 A * 9/2000 Albert et al. ................ 345/107
6,133,852 A * 10/2000 Tonkin ........................ 340/903

* cited by examiner

Primary Examiner—Don Wong
Assistant Examiner—Trinh Vo Dinh
(74) Attorney, Agent, or Firm—Leong C. Lei

(57) ABSTRACT

An electroluminescent device for communication apparatus of mobile phone for informing an incoming call for carrying out a flashing effect on the mobile phone when such occurs. The device comprises an electroluminescent means and a controller circuit wherein the controller circuit includes a signal receiving unit, an electroluminescent means flashing and driving controller unit, and a driving unit being electrically connected sequentially; and the electroluminescent means is provided on the surface of mobile phone being electrically connected to the controller circuit. This also provides a personalized housing of mobile phone.

1 Claim, 2 Drawing Sheets

ELECTROLUMINESCENT DEVICE FOR COMMUNICATION APPARATUS OF MOBILE PHONE FOR INFORMING AN INCOMING CALL

FIELD OF THE INVENTION

The present invention relates to an electroluminescent device and more particularly to an electroluminescent device for communication apparatus of mobile phone for informing an incoming call.

BACKGROUND OF THE INVENTION

Conventionally, a relatively loud, resonant sound is given for informing user when an incoming call is received. An improved technique is to show the number of calling person on display unit of mobile phone when such occurs. However, these two conventional techniques are somewhat monotonous. Further, the color of mobile phone is of single color in most cases, while a few mobile phones are colored. But these are unsatisfactory for the purpose for which the invention is concerned because there is no flashing features available on the mobile phone in the above techniques. Thus improvement exists.

SUMMARY OF THE INVENTION

It is therefore an object of the present invention to provide an electroluminescent device for communication apparatus of mobile phone for informing an incoming call for carrying out a flashing effect on the mobile phone when such occurs.

To achieve the above and other objects, the present invention provides an electroluminescent device for communication apparatus of mobile phone for informing an incoming call comprising an electroluminescent means and a controller circuit wherein the controller circuit includes a signal receiving unit, an electroluminescent means flashing and driving controller unit, and a driving unit being electrically connected sequentially; and the electroluminescent means is provided on the surface of mobile phone being electrically connected to the controller circuit. This also provides a personalized housing of mobile phone.

The above and other objects, features and advantages of the present invention will become apparent from the following detailed description taken with the accompanying drawings.

DETAILED DESCRIPTION OF THE PREFERRED EMBODIMENTS

Figure 1:
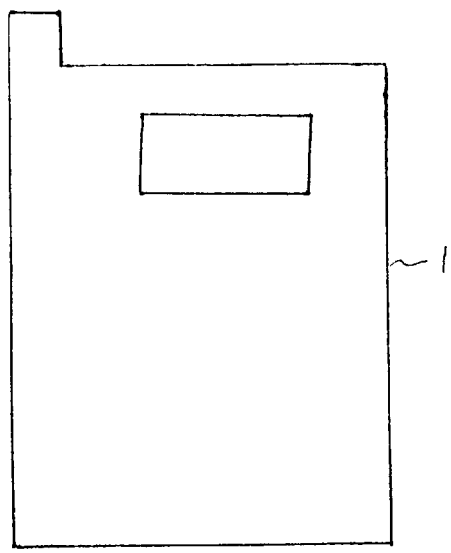
FIG. 1 is a front view of a preferred embodiment of electroluminescent device of the invention, where no phone call is received.
Figure 2:
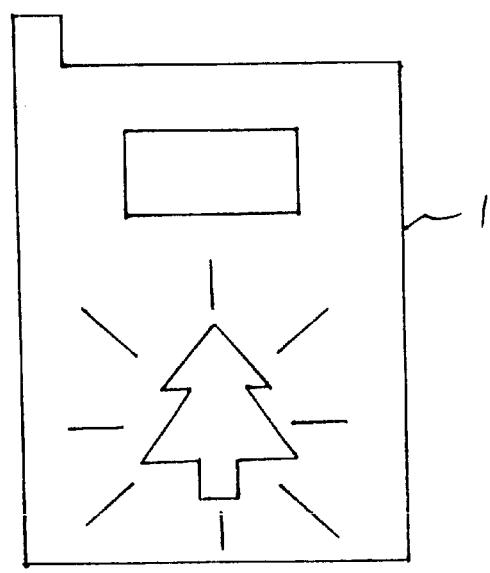
FIG. 2 is similar to FIG. 2, where a signal is received.

Referring to FIGS. 1–2, there is shown an electroluminescent device for communication apparatus of mobile phone for informing an incoming call constructed in accordance with the invention. As shown in FIG. 1, mobile phone 1 is dimmed due to no phone call. In contrast, an incoming call is received as such a flashing effect is carried out on phone 1 (FIG. 2). The details thereof is as follows.

Figure 3:
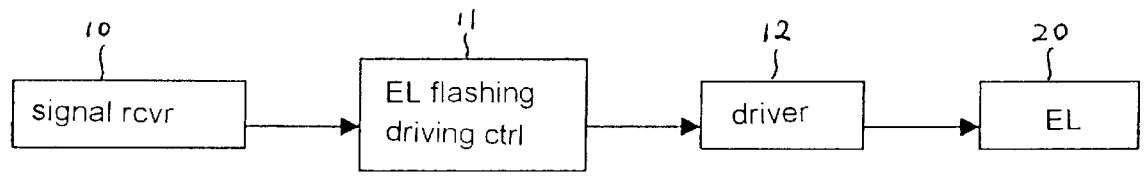
FIG. 3 is a block diagram illustrating the invention shown in FIG. 1.

FIG. 3 illustrates the units effecting the invention comprising a controller circuit including a signal receiving unit 10, an electroluminescent means flashing and driving controller unit 11, and a driving unit 12 being electrically connected sequentially; and an electroluminescent means 20 provided on the surface of mobile phone 1 being electrically connected to the driving unit 12.

Figure 4:
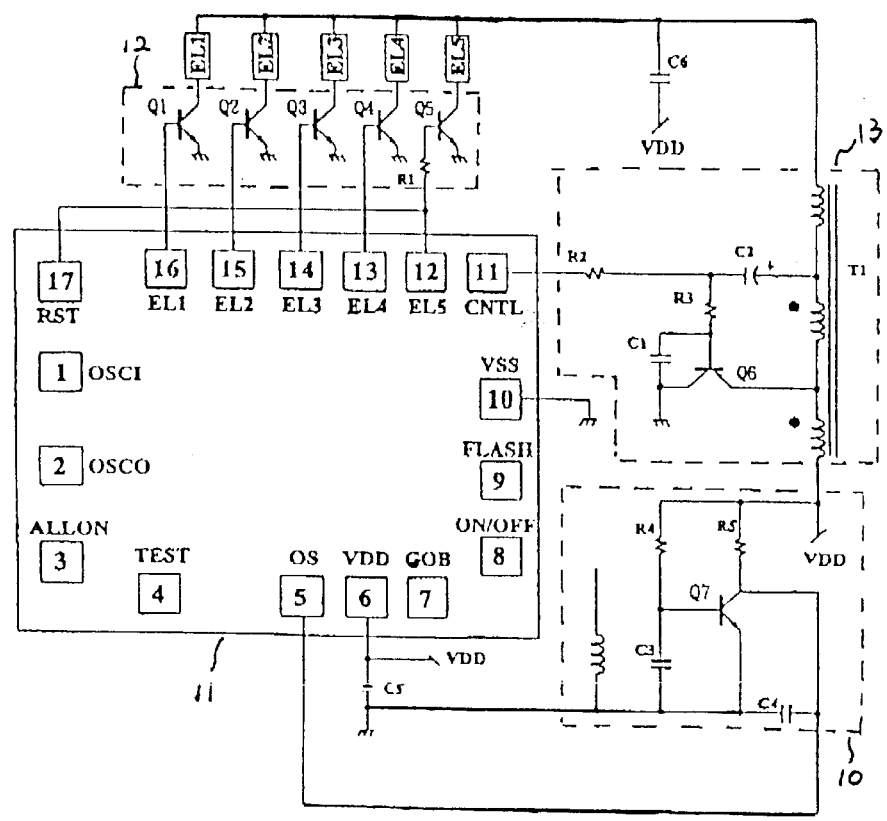
FIG. 4 is a detailed circuit diagram of the invention shown in FIG. 1.

FIG. 4 illustrates the operations of circuits of the invention. Note that the electroluminescent device of the invention and mobile phone have a common power source. The signal receiving unit 10 functions as receiving signal of an incoming call. That is, transistor Q7 is activated when a signal with frequency range of 800–1,900 MHz is received by signal receiving unit 10. This activation further causes capacitor C4 to negatively trigger. Then OS end (labeled 5) of the electroluminescent means flashing and driving controller unit 11 is triggered to drive transistors Q1–Q5 to operate sequentially. That is, perform a switching periodically wherein each of the transistors Q1–Q5 is activated in a predetermined time frame, while any of two adjacent time frames is spaced by a predetermined time. CNTL end (labeled 11) is a driving end. A driving signal is sent to a frequency changer circuit 13 from CNTL end when the CNTL end is activated. As such, capacitors C1, C2 and transistor Q6 are oscillated to activate to cause transformer T1 to increase voltage periodically. As a result, driving unit 12 is activated to create flashing effect on electroluminescent means 20. Thus user may see mobile phone flashing when an incoming call is received.

While the invention herein disclosed has been described by means of specific embodiments, numerous modifications and variations could be made thereto by those skilled in the art without departing from the scope and spirit of the invention set forth in the claims.

What is claimed is:

1. An electroluminescent device for a mobile phone comprising:

a controller including a signal receiving unit, an electroluminescent means flashing and driving controller unit, and a driving unit being electrically connected sequentially; and an electroluminescent means provided on the surface of the mobile phone being electrically connected to the controller circuit;

wherein the electroluminescent device and the mobile phone have a common power source, the signal receiving unit being used for receiving signal of an incoming call, said signal receiving unit having a transistor which is activated when a signal with frequency range of 800–1,900 MHz is received thereby causing a capacitor to negatively trigger, the electroluminescent means flashing and driving controller unit having an end triggered to drive a plurality of transistors sequentially and therefore performing a switching periodically wherein each of the plurality of transistors is activated in a predetermined time frame while any of two adjacent time frames is spaced by a predetermined time, a driving signal being sent to a frequency changer circuit when a driving end of the electroluminescent means flashing and driving controller unit is activated, thereby creating flashing effect on the electroluminescent means is when an incoming call is received.

* * * * *